No. 765,706. Patented July 26, 1904.

UNITED STATES PATENT OFFICE.

CARLO LAMARGESE, OF ROME, ITALY.

PROCESS OF CASE-HARDENING.

SPECIFICATION forming part of Letters Patent No. 765,706, dated July 26, 1904.

Application filed March 19, 1903. Serial No. 148,496. (No specimens.)

*To all whom it may concern:*

Be it known that I, CARLO LAMARGESE, mechanic, a subject of the King of Italy, and a resident of Rome, Italy, have invented certain new and useful Improvements in Processes of Case-Hardening, (for which I have applied for Letters Patent of Italy, December 20, 1902; Germany, February 25, 1903, and Austria, March 2, 1903,) of which the following is a specification.

This invention relates to a method of case-hardening iron or steel and means for economically producing the materials used for such purpose.

As is well known, iron is surface-hardened by heating to a bright red, sprinkling with prussiate of potash, causing to cool to a dull red, and cooling with water. Another well-known method consists in heating pieces of horn, hoof, bone-dust, or shreds of leather together with the article to be case-hardened in an iron box, bringing to a blood-red heat, and then immersing the article in cold water.

The invention consists in using for case-hardening a mixture of charcoal and lampblack, which enables the case-hardening to be effected in much less time than with charcoal or other mixtures so far used and at the same time obtaining a better product.

The mixture may be obtained by mixing charcoal and lampblack in suitable proportions; but it has been found that the best results are obtained when the mixture is produced by carbonizing the bark of wild pine or other resinous woods in a closed crucible or retort provided with suitable means (such as a roof of bricks not cemented together and covered with sand) for the escape of the volatile gases, but so as to retain in the retort the lampblack produced by the resin contained in the bark or added to the wood. In place of the bark of wild pine it is possible to use common wood with the addition of a suitable quantity of resin, mineral, or vegetal oils, fats, or other hydrocarbons. The metal to be case-hardened is heated in contact with the described mixture, and then the heated metal is quenched, as usual, in order to effect the case-hardening thereof.

Having now particularly described and ascertained the nature of my said invention and in what manner the same is to be performed, I declare that what I claim is—

1. That step in the art of case-hardening iron and steel which consists in first mixing together wood-charcoal and lampblack; in then placing the article in a mass consisting alone of this mixture with its metallic surfaces in intimate contact with the latter; and in then heating the article and the surrounding mixture.

2. That step in the art of case-hardening iron and steel which consists in first carbonizing the bark of wild pine; in then placing the article in a mass consisting alone of the solid products of the carbonization with its surfaces in intimate contact with such products; and in then heating the article and the surrounding material.

In witness whereof I have hereunto set my signature in the presence of two witnesses.

CARLO LAMARGESE.

Witnesses:
   G. B. ZAMARS, Jr.,
   A. RAGZI.